(12) United States Patent
Hosoda et al.

(10) Patent No.: US 7,660,730 B2
(45) Date of Patent: Feb. 9, 2010

(54) METHOD OF CREATING PRODUCTION PLAN OF DEMAND VARIATION INPUT TYPE AND METHOD OF CREATING PRODUCTION PLAN MINIMIZING RISK OF DEMAND VARIATIONS

(75) Inventors: Junko Hosoda, Yokohama (JP); Ken Igarashi, Yokohama (JP); Yuichi Kaneko, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 667 days.

(21) Appl. No.: 11/092,855

(22) Filed: Mar. 30, 2005

(65) Prior Publication Data

US 2005/0222888 A1 Oct. 6, 2005

(30) Foreign Application Priority Data

Mar. 31, 2004 (JP) ............................. 2004-105033

(51) Int. Cl.
*G06F 9/46* (2006.01)
(52) U.S. Cl. ............................................. 705/8; 705/28
(58) Field of Classification Search ...................... 705/8, 705/9, 10
See application file for complete search history.

(56) References Cited

U.S. PATENT DOCUMENTS 5,712,985 A * 1/1998 Lee et al. ......................... 705/7
5,873,251 A * 2/1999 Iino ............................. 60/660
5,930,762 A * 7/1999 Masch ........................... 705/7

(Continued)

FOREIGN PATENT DOCUMENTS

JP 9-277142 10/1997

(Continued)

OTHER PUBLICATIONS

Dong, Ming (2001). Process modeling, performance analysis and configuration simulation in integrated supply chain network design. Ph.D. dissertation, Virginia Polytechnic Institute and State University, United States—Virginia. Retrieved Sep. 9, 2009, from Dissertations & Theses: Full Text.(Publication No. AAT 3019507).*

(Continued)

*Primary Examiner*—Bradley B. Bayat
*Assistant Examiner*—Gurkanwaljit Singh
(74) *Attorney, Agent, or Firm*—Antonelli, Terry, Stout & Kraus, LLP.

(57) ABSTRACT

A production plan is created so as to minimize risk of demand variations. Forecasted values of amounts of requests are entered for each different item of products, markets, dates, past accuracy of demand forecasts, and order achievements at the time when the plan is created. Scenario information is created in which assumable amounts of request for each different item of the products, markets, and dates and probabilities at which the amounts of requests agree with actual amounts of requests are defined. Management indexes are found from the amount of stockout and amount of stock calculated in each different scenario, based on the scenario information, target values of the management indexes, and information on strongpoints. An amount of production that maximizes the achievement ratios of the management ratios to their targets within the ranges of supplied materials and within the range of the production capacity is calculated by an optimization algorithm.

3 Claims, 11 Drawing Sheets

U.S. PATENT DOCUMENTS

| | | | | |
|---|---|---|---|---|
| 5,930,763 | A * | 7/1999 | Kaneko et al. | 705/8 |
| 6,671,572 | B1 * | 12/2003 | Craft et al. | 700/184 |
| 6,671,673 | B1 * | 12/2003 | Baseman et al. | 705/7 |
| 6,990,459 | B2 * | 1/2006 | Schneider | 705/8 |
| 7,006,883 | B2 * | 2/2006 | Yamazaki | 700/97 |
| 7,039,481 | B2 * | 5/2006 | Kawase et al. | 700/99 |
| 2001/0032029 | A1 * | 10/2001 | Kauffman | 700/99 |
| 2002/0062262 | A1 * | 5/2002 | Vasconi et al. | 705/26 |
| 2003/0069658 | A1 * | 4/2003 | Yamazaki | 700/97 |
| 2003/0130883 | A1 * | 7/2003 | Schroeder et al. | 705/10 |
| 2003/0149503 | A1 * | 8/2003 | Kawase et al. | 700/99 |
| 2003/0171963 | A1 * | 9/2003 | Kurihara et al. | 705/7 |
| 2003/0229522 | A1 * | 12/2003 | Thompson et al. | 705/4 |
| 2004/0158339 | A1 * | 8/2004 | Kawase et al. | 700/97 |
| 2004/0224589 | A1 * | 11/2004 | Bacon et al. | 442/168 |
| 2005/0193353 | A1 * | 9/2005 | Malekkhosravi et al. | 716/1 |
| 2006/0206246 | A1 * | 9/2006 | Walker | 701/16 |

FOREIGN PATENT DOCUMENTS

JP         11-96210         4/1999

OTHER PUBLICATIONS

"Quick response in retailing: Components and implementation" Fiorito, Susan S, May, Eleanor G, Straughn, Katherine. International Journal of Retail & Distribution Management. Bradford: 1995. vol. 23, Iss. 5; p. 12, 10 pgs.*

"Concurrent engineering—a powerful enabler of supply chain management" Raj Balasubramanian Quality Progress; Jun 2001; 34, 6; ABI/INFORM Global p. 47.*

"Airbus's Revamp Forces New Culture Inside Consortium—European Partners Reduce Friction, Focus on Profits—The Days of the 'Harlequin' Plane Are Over" By Daniel Michaels. Asian Wall Street Journal. New York, N.Y.: Apr 4, 2001. p. 1.*

"Selecting crop production and marketing plans to minimize risk for farmers in southeast central North Dakota" by Elhard, Eugene Arthur, M.S., North Dakota State University, 1988, 160 pages; AAT 1333061.*

"Supply-chain management goes for the gold" Lamont Wood Electronic Engineering Times; Dec. 11, 2000; 1, ProQuest Computing p. 23.*

* cited by examiner

FIG. 5

| SCENARIO | PRODUCT | MARKET | DATE OF REQUEST | FORECASTED NUMBER | PROBABILITY OF OCCURRENCE (%) | GROUP |
|---|---|---|---|---|---|---|
| 0 | PC | JAPAN | 9/1/2004 | 100 | 40 | A |
| 1 | PC | JAPAN | 9/1/2004 | 200 | 60 | |
| 2 | PRINTER | USA | 9/1/2004 | 500 | 20 | |
| 3 | PRINTER | USA | 9/1/2004 | 300 | 80 | |
| 4 | PC | JAPAN | 9/1/2004 | 200 | 60 | A |
| ... | ... | ... | ... | ... | ... | ... |

FIG. 6A

INFORMATION ON PRODUCTION PLAN

| PRODUCT | MARKET | DATE OF REQUEST | NUMBER OF MANUFACTURED PRODUCTS | EXPECTED NUMBER OF OUT-OF-STOCKS | EXPECTED NUMBER OF STOCKS |
|---|---|---|---|---|---|
| PC | JAPAN | 9/1/2004 | 160 | 24 | 24 |
| PC | USA | 9/1/2004 | 340 | 15 | 30 |
| ... | ... | ... | ... | ... | ... |

FIG. 6B

INFORMATION ON MANAGEMENT TARGETS

| MANAGEMENT INDEX | CALCULATED VALUE | TARGET VALUE |
|---|---|---|
| STOCKOUT RATE | 5% | 10% |
| INVENTORY RATIO | 30% | 50% |
| ... | ... | ... |

FIG. 6C

INFORMATION ON PRODUCTION PLAN FOR EACH DIFFERENT SCENARIO

| SCENARIO | PRODUCT | MARKET | DATE OF REQUEST | NUMBER OF MANUFACTURED PRODUCTS | NUMBER OF OUT-OF-STOCKS | NUMBER OF STOCKS |
|---|---|---|---|---|---|---|
| 0 | PC | JAPAN | 9/1/2004 | 160 | 10 | 0 |
| 1 | PC | JAPAN | 9/1/2004 | 160 | 0 | 30 |
| 2 | PC | USA | 9/1/2004 | 340 | 50 | 0 |
| ... | ... | ... | ... | ... | ... | ... |

FIG. 7

| PRODUCT | MARKET | REGION | DATE OF START | DATE OF END |
|---|---|---|---|---|
| PC | JAPAN | 1 | 1 | 10 |
| | | 2 | 11 | 17 |
| | | 3 | 18 | 50 |
| PRINTER | USA | 1 | 1 | 20 |
| | | 2 | 21 | 30 |
| ... | ... | ... | ... | ... |

FIG. 8

| PRODUCT | MARKET | REGION | RANGE OF TILT | | ALGORITHM OF COMPUTING AMOUNT OF PRODUCTION | TARGET VALUES OF MANAGEMENT INDEXES | |
|---|---|---|---|---|---|---|---|
| | | | DOWNWARD | UPWARD | | STOCKOUT RATE | STOCK TURNOUT RATE |
| PC | JAPAN | 1 | +20 | ∞ | DEMAND VARIATION INPUT TYPE | 0 | 1 |
| | | 2 | −20 | +19 | SAFETY STOCK ADDITION TYPE | 0 | 5 |
| | | 3 | −∞ | −21 | DEMAND VARIATION INPUT TYPE | 40 | 10 |
| PRINTER | USA | 1 | 0 | ∞ | SAFETY STOCK ADDITION TYPE | 0 | 5 |
| | | 2 | −∞ | −1 | DEMAND VARIATION INPUT TYPE | 30 | 15 |
| ... | ... | ... | ... | ... | ... | ... | ... |

FIG. 10

| RESULTS OF OPTIMIZATION | | | | RESULTS FOR EACH DIFFERENT SCENARIO | | | | | |
|---|---|---|---|---|---|---|---|---|---|
| PRODUCT | MARKET | DATE OF REQUEST | NUMBER OF MANUFACTURED PRODUCTS | FORECASTED NUMBER | NUMBER OF STOCKS | NUMBER OF OUT-OF-STOCKS | PROBABILITY OF OCCURRENCE (%) | STOCKOUT RATE (%) | STOCK TURNOUT RATE (%) |
| PC | JAPAN | 9/1/2004 | 160 | 100 | 60 | 0 | 40 | 0 | 100/60x100 |
|  |  |  |  | 200 | 0 | 40 | 60 | 400/200x100 | 0 |
| PC | USA | 9/1/2004 | 340 | 500 | 160 | 0 | 20 | 0 | 500/160x100 |
| ... | ... | ... | ... | ... | ... | ... | ... | ... | ... |

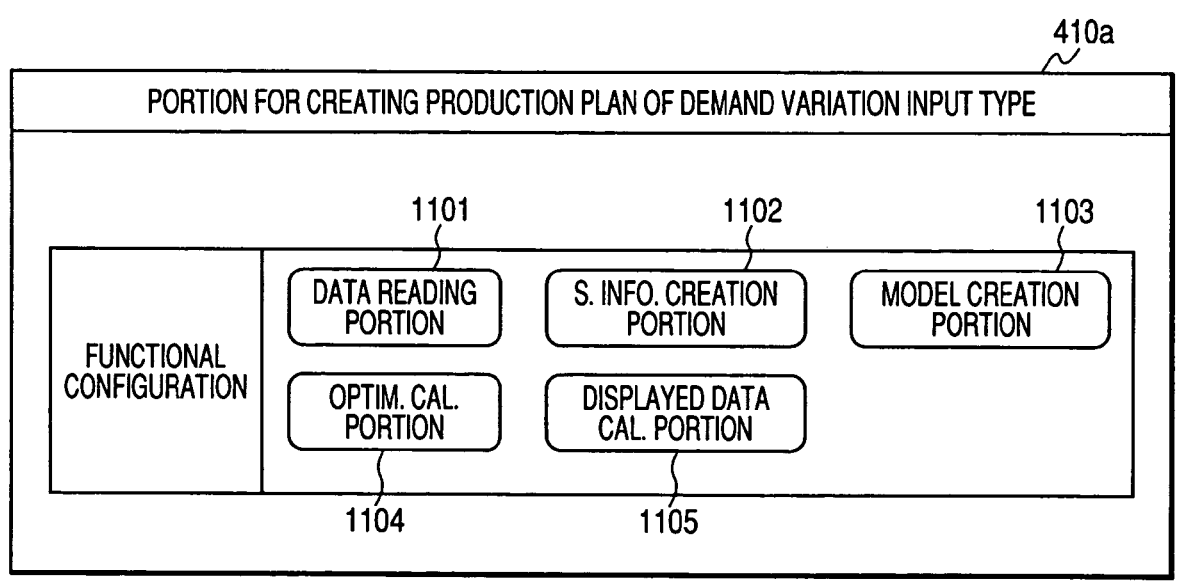

FIG. 12

| | (a) PRIOR MODEL | (b) MODEL OF THE INVENTION |
|---|---|---|
| AMOUNT OF REQUEST | NUMBER OF 9/1 PRODUCTS A: 160 | 9/1 100 PRODUCTS A 40%<br>9/1 200 PRODUCTS A 60%<br>NUMBER OF PRODUCTS REQUIRED BY PRO. PLAN: 160 |
| NUMBER OF MAN. PRODUCTS | NUMBER OF 9/1 PRODUCTS A: 160 | NUMBER OF 9/1 PRODUCTS A: 160 |
| OUT-OF-STOCKS/STOCKS | NUMBER OF MAN. PRODUCTS: 160 → NUMBER OF REQUEST: 160 → NUMBER OF OUT-OF-STOCKS: 0 / NUMBER OF STOCKS: 0 | NUMBER OF MAN. PRODUCTS: 160 → NUMBER OF REQUEST: 100 → NUMBER OF OUT-OF-STOCKS: 0 / NUMBER OF STOCKS: 60<br>NUMBER OF MAN. PRODUCTS: 160 → NUMBER OF REQUEST: 200 → NUMBER OF OUT-OF-STOCKS: 40 / NUMBER OF STOCKS: 0 |
| STOCKOUT RATE | NUMBER OF OUT-OF-STOCKS/NUMBER OF REQUEST × 100 = 0% | NUMBER OF OUT-OF-STOCKS IN PRO. PLAN: 24<br>NUMBER OF STOCKS IN PRO. PLAN: 24<br>NUMBER OF OUT-OF-STOCKS/NUMBER OF REQUEST IN PRO. PLAN × 100 = 15% |
| INVENTORY RATIO | NUMBER OF STOCKS/NUMBER OF REQUEST × 100 = 0% | NUMBER OF STOCKS/NUMBER OF REQUEST IN PRO. PLAN × 100 = 15% |

METHOD OF CREATING PRODUCTION PLAN OF DEMAND VARIATION INPUT TYPE AND METHOD OF CREATING PRODUCTION PLAN MINIMIZING RISK OF DEMAND VARIATIONS

BACKGROUND OF THE INVENTION

The present invention relates in general to the forecasting of a number of products required by the market before a demand for such products is established, the ordering of materials for the products, and the manufacture of the products; and, more particularly, the invention relates to a technique associated with a method of creating a production plan that minimizes the managerial risk caused by out-of-stock and overstock conditions created by errors in forecasting the demand for a product at the time when the materials are ordered.

In a manufacturing industry where speculative productions are performed, the number of ordered products is forecasted before an order for the product is established. Then, the materials are ordered. Generally, a long time of more than one month is required to procure the materials. Therefore, the amount forecasted at the time when the materials are ordered may be different from the actual demand. Where the actual demand is smaller than the amount forecasted at the time when the materials are ordered, an excess stock is produced. In the reverse case, an out-of-stock condition will occur. Such conditions may lead to a loss in profit. Furthermore, the out-of-stock condition will incur a decrease in the amount of sales, putting pressure on the corporate management. Therefore, it is desired that overstock and out-of-stock conditions be prevented as much as possible.

To prevent the occurrence of overstock and out-of-stock conditions, the date at which products are introduced and the amount (hereinafter referred to as the introduction plan) have been heretofore predetermined at the time when the demand is established. When the introduction plan is created, the amount of materials is adjusted to compensate for oversupply or undersupply caused by a difference between the amount forecasted at the time when the materials are ordered and the actual demand. In addition, it is necessary to determine the amount of introduction, such that the production is produced within the operation time of the production line. That is, each one of many kinds (more than hundreds of kinds in some cases) of products must be judged to determine whether its parts are sufficiently or insufficiently available. The excess parts must be assigned to insufficient parts of other products. Then, the date of introduction and the amount of introduction must be determined such that the operating time of the production line is not exceeded and that the products are delivered at the date of request. Especially, where the amount forecasted at the time when the materials are ordered is greatly different from the actual demand, the amount of adjustment is large. The introduction plan is created involving many process steps. Furthermore, in some cases, it is impossible to fully compensate for an oversupply or an undersupply of materials or to adjust the load on the production line in spite of the fact that the introduction plan has been created with many process steps. As a result, an overstock or out-of-stock condition is produced.

As a technique for coping with such demand variations, JP-A-11-96210 discloses a technique for adjusting for an overload by calculating a planned load on the equipment from the number of products planned to be fabricated and reducing a load exceeding the processing capability of the equipment in accordance with a specified reduction policy. Also, JP-A-9-277142 discloses a technique for adjusting for an oversupply or undersupply of ordered materials, by forecasting the ratio of optional products producing violent demand variations or long lead time products relative to the group of products. Another, generally used method of eliminating a shortage of materials is disclosed by Kazunari TANAKA in *Illustrated Inventory Control*, Nippon Jitsugyo Publishing Co., Ltd., 2000. In particular, when materials are ordered, it is assumed that a certain amount of shortage will occur. The amounts of materials exceeding the required amounts are ordered as safety inventory control.

However, with the techniques disclosed in the above-cited JP-A-11-96210 and JP-A-9-277142, it is only possible to adjust one of oversupply or undersupply of materials or an excess of production capacity produced by demand variations. It has been impossible to adjust both at the same time.

Furthermore, in the technique described by Kazunari TANAKA in *Illustrated Inventory Control*, Nippon Jitsugyo Publishing Co., Ltd., 2000, a safety stock quantity is determined based on the assumption that the transition of a variation of a forthcoming amount of a request is similar to the transition of a variation of the past sales achievements. Therefore, when the transition of a variation of a forthcoming amount of a request is greatly different from the transition of a variation of the past sales achievements, as typically occurs in the initial or last stage of a product life cycle, an appropriate safe stock quantity cannot be set. This results in an overstock or out-of-stock condition.

SUMMARY OF THE INVENTION

In view of the foregoing problems, the present invention has been made. It is an object of the present invention to provide a method of creating a production plan that is capable of preventing overstock and out-of-stock conditions as much as possible without adjusting the oversupply or undersupply of materials or the production capacity, even if demand variations take place. It is another object of the present invention to provide a technique for automatically determining a method of creating a production plan appropriately according to the process of the product life cycle.

In accordance with the present invention, forecasted amounts of a demand for each different item of products, markets, and dates are entered. Also, the past accuracy of demand forecasts is entered. In addition, the orders achievements at the time of the planning are entered. Probable amounts of a request for each one of these different items, such as the kind of product, are assumed. The probabilities (probabilities of occurrences) at which the probable amounts of a request are coincident with actual demands are assumed. Combinations of these probable amounts of a request for each one of those different items, such as a kind of product, and the probabilities of occurrences are referred to as scenarios.

Furthermore, in accordance with the present invention, management indexes capable of quantitatively evaluating a production plan, such as a stockout rate and a stock turnover rate, are adopted as indexes for quantitatively evaluating the risk of demand variations. Target values of the management indexes are previously set. An amount of production that maximizes the achievement ratios of the management indexes to their targets within the ranges of amounts of supply of materials and the range of the production capacity is regarded as a production plan that minimizes the risk of demand variations.

When the values of the management indexes are computed, calculations are performed to make an adjustment between the amount of production and the amount of request in each different scenario. The amount of the stockout and the amount of stock are calculated. The amount of stockout and amount of stock are multiplied by probabilities of occurrence in each individual scenario. The resulting products are summed up for all of the scenarios. Thus, the amount of stockout and the amount of stock for the production plan are calculated. Then, the values of the management indexes are calculated, using the amount of stockout and the amount of stock for the production plan.

An optimization algorithm, such as linear programming or a hereditary algorithm, is adopted as a technique for calculating the amount of production that maximizes the achievement ratios of the management indexes to their targets within the ranges of the amounts of supplied materials and the production capacity.

As described so far, in the method of creating a production plan of the demand variation input type in accordance with the present invention, information about scenarios are created from forecasted amounts of request, from the past accuracy of demand forecasts, and from orders achievements at the time when the plan is made. The forecasted amounts of request are calculated for each different item of products, markets, and dates by a demand forecasting system. The information about the scenarios, the target values of the management indexes, and information about the characteristics of strongpoints are read in. The values of the management indexes are found from the amount of stockout and the amount of stock computed in each individual scenario. An amount of production that maximizes the achievement ratios of the values of the management indexes to their targets within the ranges of amounts of supplied materials and the range of the production capacity are calculated by an optimization algorithm.

Moreover, in a method of creating a production plan that minimizes the risk of demand variations in accordance with the present invention, the aforementioned method of creating a production plan of the demand variation input type and other methods of maintaining the safety stock are used in combination. Thus, the risk of demand variations is reduced to a minimum. The life cycles of products are time-sequence transitions of the amounts of sale after the date of start of sale. In accordance with the present invention, an algorithm used for calculation of the amount of production is previously set for each range of the forecasted amounts of the life cycles and of the tilt of forecasted values of sale (i.e., the amount of variation of the forecasted amount of sale per unit time during a specified period). The values of the sales achievements are entered. Thus, the algorithm used for the calculation of the amount of production is determined. Where the aforementioned method of creating a production plan of the demand variation input type is applied, target values of the management indexes are determined from the range of the tilt of the forecasted amount of sale. The production plan is calculated by the aforementioned method of creating a production plan of the demand variation input type, using the calculated values of the management indexes.

BRIEF DESCRIPTION OF THE DRAWINGS

FIG. 5 is a table showing an example of data set about scenario information treated by the present invention;

FIGS. 6A, 6B and 6C are tables showing examples of data sets about information on production planning, information on management targets, and information on production planning for each individual scenario, the data sets being treated in accordance with the present invention;

FIG. 7 is a table showing an example of data set about information for division of a production life cycle, the data set being treated in accordance with the present invention;

FIG. 8 is a table showing an example of data set about information on regions obtained by dividing a product life cycle, the data set being treated in accordance with the present invention;

FIG. 10 is a table showing an example of data set displayed by the present invention;

FIG. 11 is a diagram showing an example of the functional configuration of the production plan creation portion of the demand variation input type shown in FIG. 4;

FIG. 12 is a diagram in which a technique using an example of a conventional model and a technique using an example of a model of the present invention are compared.

DESCRIPTION OF THE PREFERRED EMBODIMENTS

Embodiments of the present invention hereinafter will be described with reference to the accompanying drawings.

Figure 1:
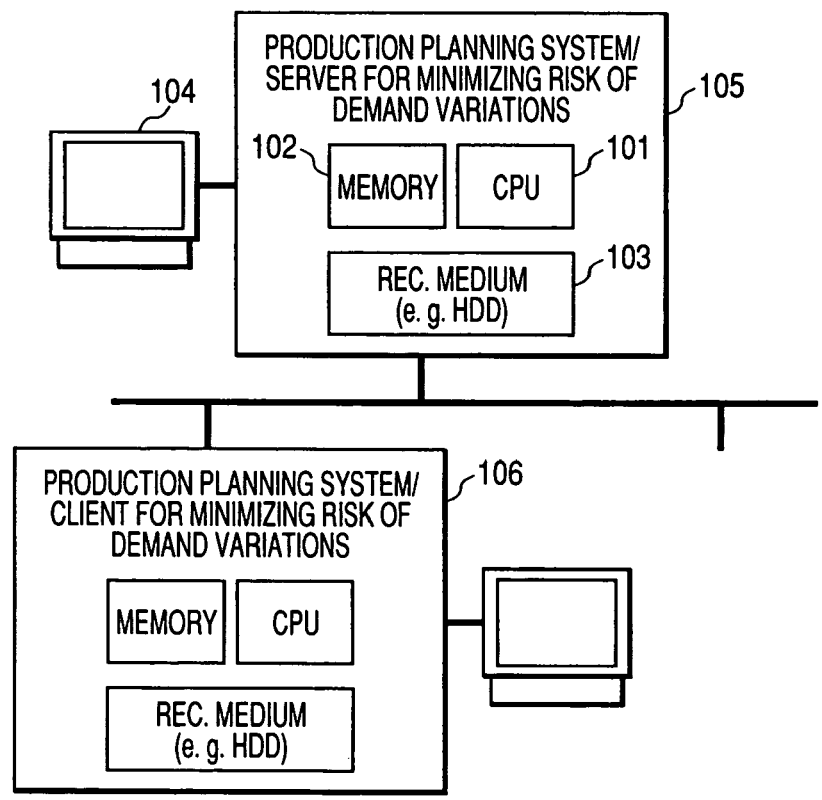
FIG. 1 is a block diagram illustrating a hardware configuration of a production planning system that minimizes the risk of demand variations, the system performing given processing functions of a sequence of processing functions performed by a method of creating a production plan that minimizes the risk of demand variations in accordance with the present invention.

The hardware configuration of a production planning system for minimizing the risk of demand variations is shown in FIG. 1. Of the processing performed by a method of creating a production plan, so as to minimize the risk of demand variations in accordance with the present invention, given processing functions (characteristic processing functions) are imparted to the planning system. The present system shown in FIG. 1 comprises a computer 105 (or 106), an external output device 104, and input devices including a keyboard and a mouse (not shown). The computer 105 has a CPU 101, a memory 102, and a recording medium 103, such as a HDD. Programs having given functions of the method of creating the production plan in such a way as to minimize the risk of demand variations in accordance with the present invention are stored in the recording medium 103. The programs are read into the memory 102, and calculations are performed by the CPU 101. The results are output to the external output device 104.

The production planning system according to the present invention for minimizing the risk of demand variations can adopt a server-client system. In this case, information about activation is sent from the client computer 106. The server computer 105 receiving the information about the activation performs processing for judging the product life cycle, processing for determining an algorithm for calculating the production plan, and processing for calculating the production plan. After the calculation of the production plan, the results of the calculations are sent from the server computer 105 to the client computer 106, which in turn displays the results. Transmission of data between the server computer 105 and the client computer 106 is made via a network.

Figure 2:
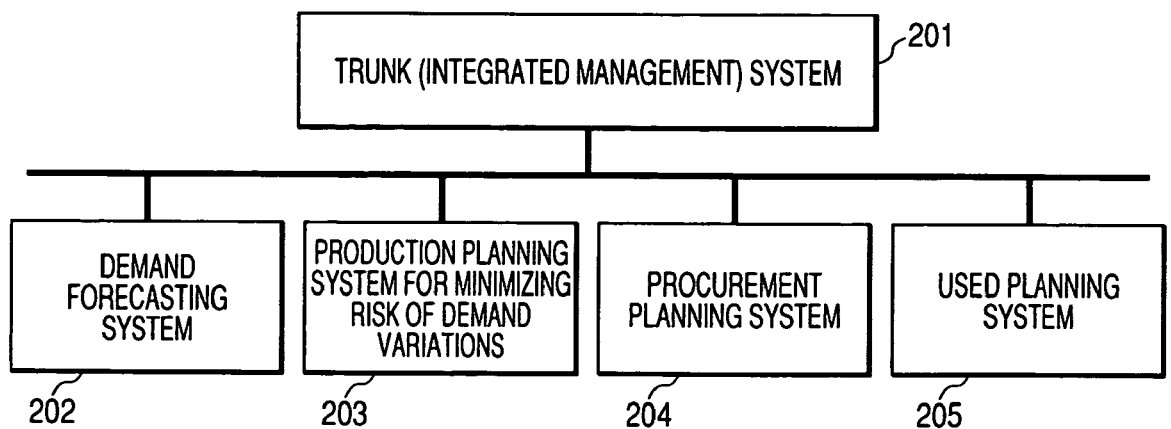
FIG. 2 is a block diagram illustrating an example of the overall configuration of a planning system to which the present invention is applied.

Application of the present invention to a planning system will be described next, the system being used in the manufacturing industry that fabricates speculative products. FIG. 2 shows an example of the configuration of the planning system to which the invention is applied. The planning system shown in FIG. 2 comprises a demand-forecasting system 202, a production planning system 203 for minimizing the risk of demand variations, a procurement planning system 204, an introduction planning system 205, and a trunk (integrated management) system 201. The trunk (integrated management) system 201 manages data forming a basis of corporate management, such as sales achievements, production achievements, information about products, and information about strongpoints.

Figure 3:
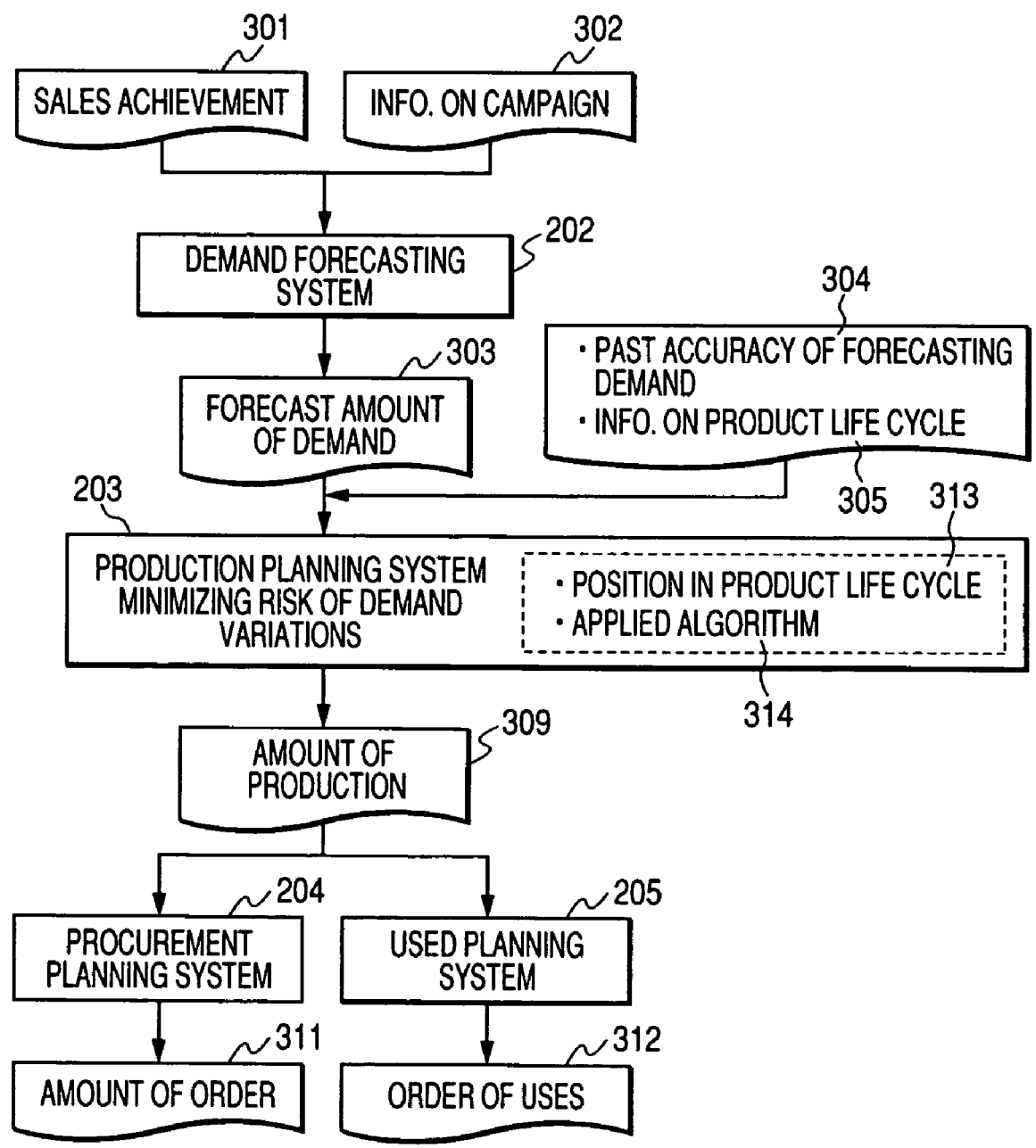
FIG. 3 is a processing flow diagram schematically illustrating the flow of processing performed by each system shown in FIG. 2, the processing being contained in the flow of planning operations executed by the planning system shown in FIG. 2, and in which main input and output data are also shown.

FIG. 3 is a diagram illustrating the flow of processing in each system shown in FIG. 2, the processing being contained in the flow of planning operations executed by the planning system shown in FIG. 2. Main input and output data are also shown.

A planning operation is performed approximately once per month or per week. First, in an operation for forecasting the demand, the system 202 for forecasting the demand reads in past sales achievements 301 or information 302 on campaigns, and it calculates a forecasted value 303 of a future amount of request by a general technique, such as regression analysis.

In a production planning operation performed next, the production planning system 203 for minimizing the risk of demand variations calculates an amount of production or a number of manufactured products which maximizes the achievement ratios of the values of management indexes to their targets. Therefore, the planning system 203 first reads in the forecasted value 303 of a future amount of demand that is represented by output data received from the demand forecasting system 202. The planning system also reads in information 304 on the past accuracy of forecasting from a database. In addition, the planning system reads in time-sequence transition 305 (referred to herein as "information on product life cycle or on life cycle") of the amount of sale forecasted after the date of start of sale of the products. The information on the product life cycle has been previously found, taking into account information about campaigns, using the past sales achievements of products similar to the products planned to be manufactured. The information is stored in the database.

The production planning system 203 for minimizing the risk of demand variations identifies the present position 313 in the product life cycle, based on forecasted numbers 303 of the demand for each individual item of products, markets, and dates, on the information 304 about the past accuracy of demand forecasts, and on the information 305 about the product life cycle. The planning system 203 determines an algorithm 314 used currently to determine the number of manufactured products out of plural previously registered production amount determination algorithms. The registered algorithms include a method of creating a production plan of the demand variation input type and a method of determining the number of manufactured products taking into account the safety inventory. Using the determined algorithm, the amount of production 309 or number of manufactured products is computed.

After calculating the number of manufactured products 309, in the operation for planning procurement, the procurement planning system 204 reads in the number of products 309 calculated in the operation for creating the production plan. An amount of order 311 to a parts vendor is calculated by a general technique, such as materials requirements planning (MRP). In an operation for determining an introduced plan, the introduction planning system 205 reads in the amount of production 309 calculated in the operation for planning the production. The order 312 in which products are introduced onto the respective production lines is determined by a general technique, such as a method consisting of assigning products having earlier dates of request to their lines earlier.

As described previously, the production planning system 203 for minimizing the risk of demand variations calculates the amount of production 309 which is to be read in by the procurement planning system 204 and by the introduction planning system 205 after the forecasted value 303 of the amount of request has been calculated by the demand forecasting system 202.

Figure 4:
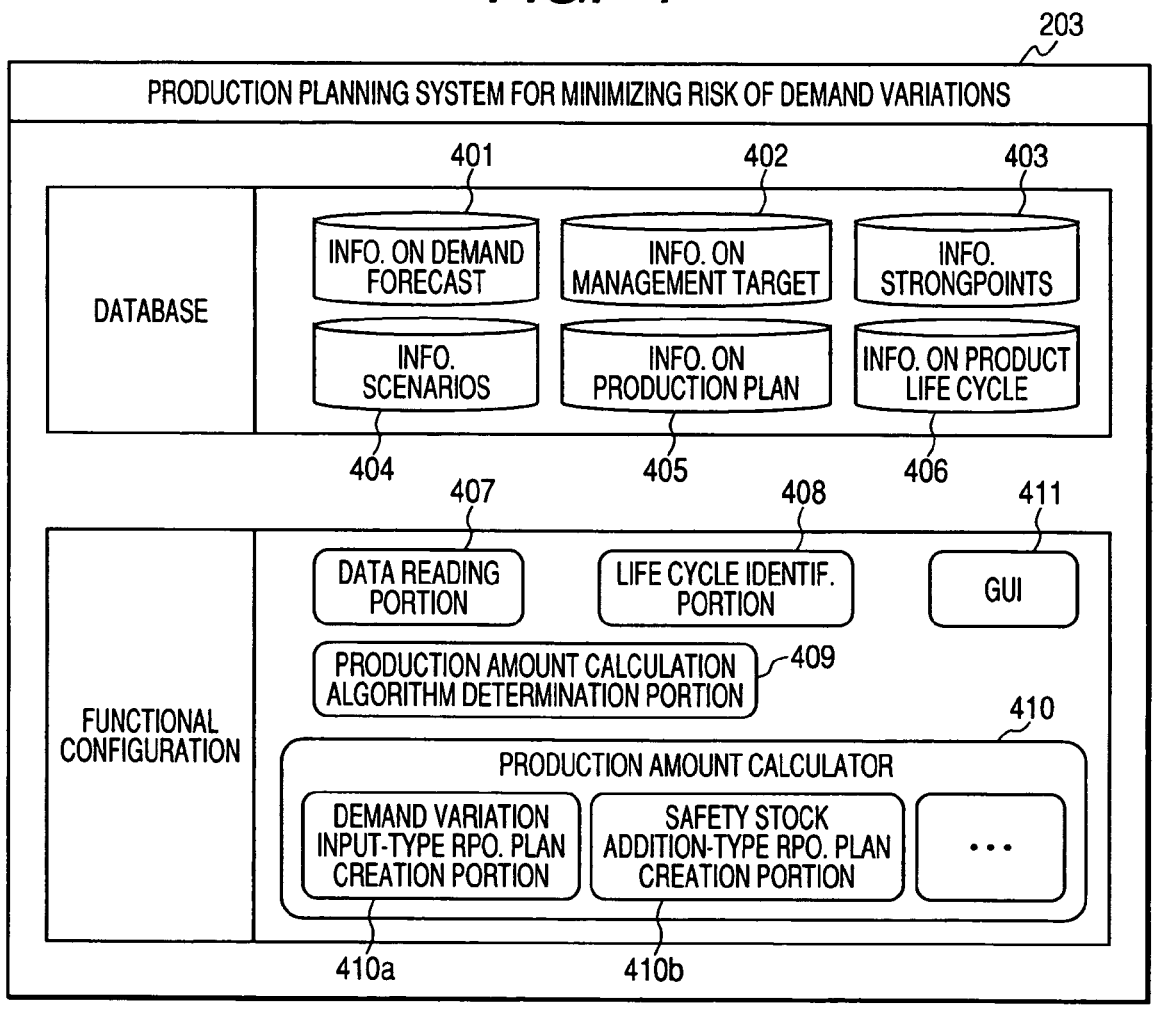
FIG. 4 is a block diagram showing an example of the functional configuration of the production planning system shown in FIG. 2 for minimizing the risk of demand variations.

FIG. 4 is a diagram showing the functional configuration of the production planning system 203 for minimizing the risk of demand variations. The planning system 203 has six databases, i.e., a database 401 of information about demand forecasting, a database 402 of information about management targets, a database 403 of information about strongpoints, a database 404 of information about scenarios, a database 405 of information about production plans, and a database 406 of information about product life cycles. The data stored in these databases will be described later. In addition, the planning system 203 has five processing functional portions, i.e., data reading portion 407, product life cycle identification portion 408, production amount calculating algorithm determination portion 409, production amount calculation portion 410, and a GUI (graphical user interface) 411.

The processing procedure of the algorithm used to calculate the amount of production 309 is registered in the production amount calculation portion 410. In the example of FIG. 4, a production plan creation portion 410a of the demand variation input type for creating an amount of production by a method of creating a production plan of the demand variation input type according to the present invention and a production plan creation portion 410b of the safety stock addition type are registered. The creation portion 410b creates an amount of production by adding a safety stock quantity to a uniquely defined amount of request. Where an algorithm used to calculate the amount of production 309 is added, its processing procedure is registered in the production amount calculation portion 410.

Processing performed by the production plan creation portion 410a of the demand variation input type will be described later. A method of determining the amount of production by a general technique, such as materials requirements planning (MRP) using an amount of requirement, is registered in the production plan creation portion 410b of the safety stock addition type. The amount of requirement is obtained by adding the safety stock quantity to a uniquely defined amount of requirement.

The data stored in the databases of FIG. 4 will be described next.

Forecasted values of the amount of requirement (information on demand forecasting) for each different item of products, markets, and dates are stored in the database 401 of the information on demand forecasting. Also, information about orders received that are amounts of orders for each different item of products, markets, and dates is stored. In addition, information on the accuracy at which the demand is forecasted is stored. The accuracy is defined by comparing the past forecasted amounts of demand with actual amounts of requirement. These data items are stored in the database 401 of the information about demand forecasting by the demand forecasting system 202 after the end of the operation for forecasting the demand.

Information about the characteristics of manufacturing plants and parts vendors, including manufacturing times of products in the plants, the running times of production lines, the rate of occurrence of failures during manufacturing, the amounts of materials that can be supplied from the parts vendors, and the times required to supply the materials, is stored in the database 403 of the information about strongpoints. Also, supply information, including supply routes from the parts vendors to the plants and from the plants to the market and supply times, is stored. Information regarding the characteristics of the plants and parts vendors and information about supply are herein collectively referred to as the information on strongpoints. The information on the strongpoints is stored in the database 403 of the information on the strongpoints by the corporate trunk system 201 before the method of creating a production plan so as to minimize the risk of demand variations in accordance with the present invention is implemented.

Target values of management indexes to quantitatively evaluate the production plan by the production plan creation method of the demand variation input type of the present invention are stored in the database 402 of the information on management targets. As long as a method of calculation can be described as a model, the management indexes can be any indexes, such as rate of stockout, stock turnout rate, profit, cash flow, and operating ratio. The target values of the management indexes may be determined during processing performed by the production plan creation system 203 minimizing the risk of demand variations of the invention. The target value may be stored in the database 402 of the information on management indexes by the trunk system 201 before the production planning system 203 is started. Excessive process steps will not be consumed in calculating the target values of the management indexes if desired target values are automatically determined from target values of management indexes which have been previously given for ranges of the tilt of the forecasted values of sale of products based on processing for identifying the ranges of the tilt of the forecasted values of sale of the products (regions obtained by dividing the product life cycle) during processing performed by the production planning system 203 minimizing the risk of demand variations.

Scenarios and data about the scenarios defining groups to which the scenarios belong are stored in the database 404 of the information on the scenarios. The scenarios are combinations of the forecasted values of the amount of request for each individual item of products, markets, and dates (dates of request) and the probabilities of occurrence at which the forecasted values agree with actual amounts of request, as described previously.

In accordance with the present invention, it is assumed that, where one takes notice of one certain item of products, markets, and dates of request, the actual amount of request agrees with any one scenario. Therefore, the sum of the probabilities of occurrence at certain items of the products, markets, and dates of request is 100%. That is, the scenarios are created such that the total sum of the probabilities of occurrence of the scenarios at certain items of the products, markets, and dates of request is 100%.

One example of data set about the scenarios is shown in FIG. 5. In scenario "0", the forecasted value of the required number of personal computers (PCs) in the Japanese market at Sep. 1, 2004 is 100. The probability of occurrence is 40%. Scenario "0" belongs to group A. In this way, the scenario number, forecasted amounts (numbers) of request for each different item of products, markets, and dates, probabilities of occurrence, and groups to which the scenarios belong are defined by the information on scenarios.

The group is a unit for minimizing the risk of demand variations. In the case of the example shown in FIG. 5, scenarios "0" and "4" belong to group A. No group is defined for scenarios "1", "2", and "3". In this case, in group A, an amount of production is computed such that the sum of the risk of demand variations in scenario "0" and the risk of demand variations in scenario "4" is reduced to a minimum if the risk of demand variations in scenario "0" or "4" alone is increased. With respect to each scenario for which no group is defined, the risk of demand variations in that scenario alone is minimized. In addition, as an example, where transition of the amount of request of personal computers at Sep. 1, 2004 to Sep. 30, 2004 in the Japanese market is defined, or where the amounts of request of personal computers in the Japanese market and in the USA market, respectively, at Sep. 1, 2004 are defined as values having a vassal relationship, these scenarios are defined as the same group.

The amounts of production calculated by the production amount calculation portion 410 for each different item of products, markets, and dates, information on production plans defining planned stock quantity and stockout quantity, the value of each management index calculated using the planed stock quantity and stockout quantity, and the target values of the management indexes determined during the processing or previously given are stored in the database 405 of the information on production plans. In addition, information on scenario-specific production plans is stored. This information defines the stock quantity and stockout quantity produced if the amount of production calculated by the production amount calculation portion 410 is obtained, provided that the actual amount of request agrees with the amount forecasted in the scenario.

An example of data set about information on production plans is shown in FIG. 6A. The first row shows the results of a calculation performed using personal computers, the Japanese market, and Sep. 1, 2004. The number of manufactured products is 160. At this time, the number of out-of-stocks in the production plan is 24. The number of stocks is 24.

An example of data set about information on management targets is shown in FIG. 6B. In this example, the target value is a rate of stockout of 10%. The result of calculation is 5%.

An example of data set about information on scenario-specific production plans is shown in FIG. 6C. Scenario "0" is a forecasted value obtained from personal computers, the Japanese market, and Sep. 1, 2004. If 160 products are manufactured according to the result of calculation, a stockout of 10 products occurs.

In this way, the values of management indexes calculated using the amount of production 309, the amounts of stockouts and the amounts of stocks which can be produced in each different scenario, and other data displayed by the GUI 411, are stored in the database 405 of the information about production plans, in addition to the amount of production 309 computed by the production amount calculation portion 410.

Information about the product life cycle that is the forecasted value of the transition of an amount of sale after the date of start of sale of products, information about division of the product life cycle specifying ranges obtained by dividing the product life cycle into the plural ranges along a time axis, the tilt of the product life cycle in each range of the product life cycle (i.e., the amount of variation of the forecasted amount of sale per unit time during a specified period), an algorithm used to calculate the amount of production, and information about the division of the product life cycle defining the target values of the management indexes are stored in the database 406 of the information on the product life cycle.

An example of a data set about the information on the division of the product life cycle is shown in FIG. 7. An example of a data set about the information on the regions of the product life cycle is shown in FIG. 8.

In FIG. 7, the first row indicates that the date of start of the first region of the life cycle of personal computers in the Japanese market is the date of the start of sale and that the date of the end is 10 days after the date of the start of sale. The time axis of the product life cycle is represented in terms of the number of days in the total period in which the date of start of sale is defined to be 1. The date of the start and date of the end of each region of the life cycle are defined in terms of the number of days in the total period.

The first row of the table shown in FIG. 8 indicates information belonging to the first region of the product life cycle of personal computers in the Japanese market. The tilt of the amount of sale in this region is more than 20 products per day. The algorithm used to calculate the amount of production 309 is a method of creating a production plan of the demand variation input type. When the amount of production is calculated by the method of creating a production plan of the demand variation input type, a stockout rate of 0% and a stock turnover rate of 1 are used as target values of management indexes. The second row indicates information about the second region of the product life cycle of personal computers in the Japanese market. The tilt of the amount of sale in this region is more than −20 products per day and less than 19 products per day. When an amount of production 309 is calculated in this region, the method of planning a production of the safety stock addition type is adopted. A stockout rate of 0% and a stock turnover rate of 5 are used as target values of management indexes. The third row indicates information about the third region of the product life cycle of personal computers in the Japanese market. The tilt of the amount of sale in this region is less than −19 products per day. When an amount of production 309 is calculated in this region, the method of creating a production plan of the demand variation input type is adopted. A stockout rate of 40% and a stock turnover rate of 10 are used as target values of management indexes.

With respect to the regions which are obtained by dividing the product life cycle and which are ranges of the tilt of the life cycle, any area where the tilt varies greatly is regarded as a partition between plural regions and divided into an appropriate number of regions. In accordance with the present invention, in unstable regions, the method of creating a production plan of the demand variation input type is adopted as the algorithm used to compute the amount of production 309 to prevent overstock and out-of-stock conditions as much as possible. In the unstable regions, the transition of a variation of a future amount of request is greatly different from the transition of a variation of the past sales achievements. Examples of such unstable regions include an initial phase of the product life cycle in which the tilts within the regions are steep and an attenuating region. In stable regions where the transition of a variation of a future amount of request is not greatly different from the transition of a variation of the past sales achievements, the method of planning a production of the safety stock addition type is adopted as an algorithm used to calculate the amount of production 309. An example of the stable region includes matured regions of the product life cycle in which the tilts within the regions are mild. In this way, the amount of production 309 capable of holding an appropriate quantity of safety stock is computed.

Figure 9:
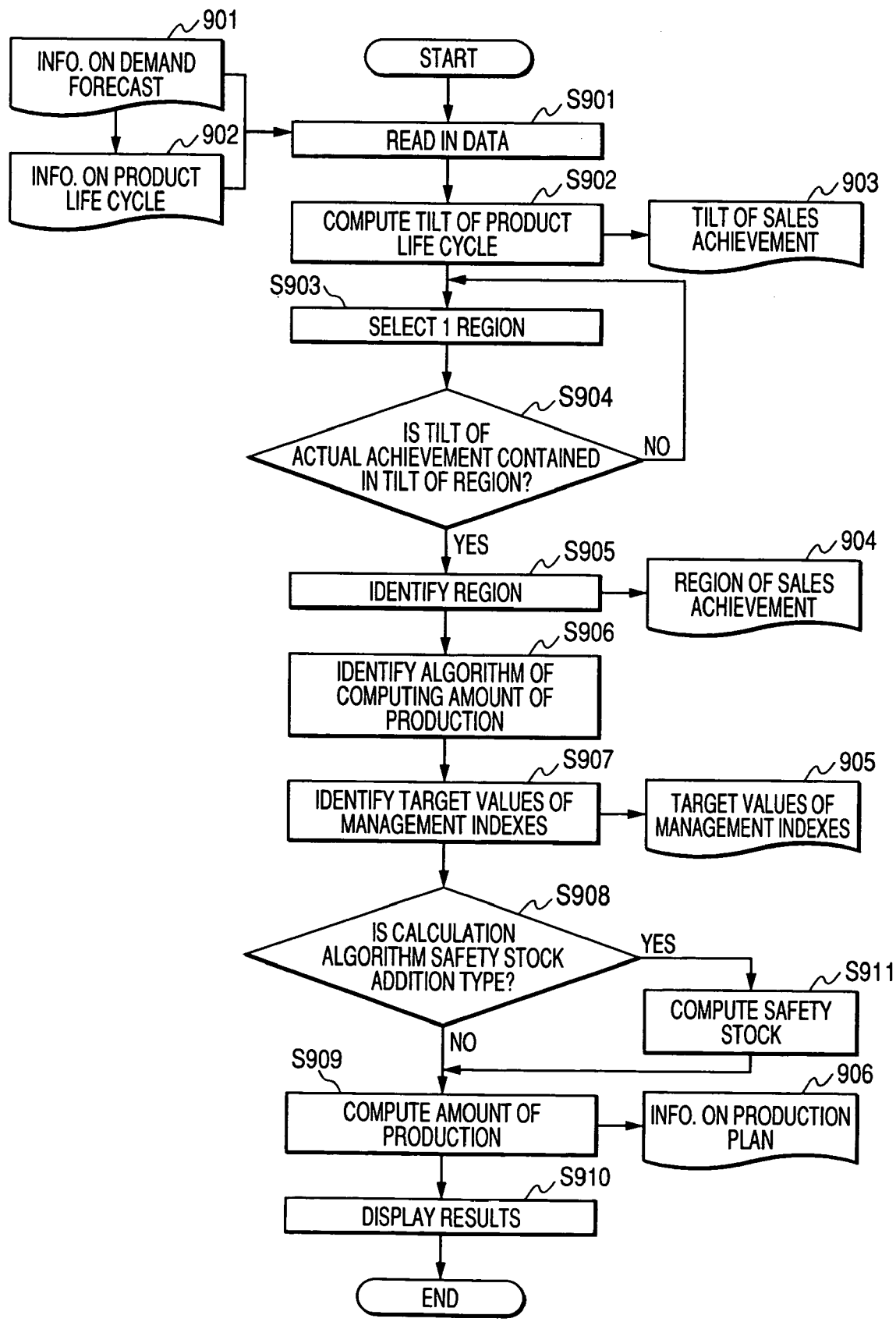
FIG. 9 is a flowchart illustrating the flow of processing in the production planning system shown in FIG. 2 for minimizing the risk of demand variations.

The flow of processing by the method of creating a production plan in such a way as to minimize the risk of demand variations in accordance with the present invention will be described next with reference to FIG. 9.

When the production planning system 203 minimizing the risk of demand variations is started, the data reading portion 407 reads in data stored in the database 401 of the information 901 on demand forecasts and the database 406 of the information 902 on product life cycles (step S901).

After the data has been read in, the product life cycle identification portion 408 calculates the tilt 903 of the sales achievement for each individual item of products and markets from the demand forecasting information 901. The tilt of the sales achievement is taken for a previously given period, for example, from the past 1 week to the forthcoming 1 week. A graph is created. The day is taken on the horizontal axis. The sales achievement is taken for past days on the vertical axis, and a forecasted amount of sale (forecasted amount of demand) is taken for forthcoming days on the vertical axis. Calculations are performed by a least squared method (S902).

Then, the product life cycle identification portion 408 identifies the present position in the product life cycle for each different item of products and markets. The identification portion 408 selects one of the regions of the life cycle for each different item of products and markets, the regions being determined in the product life cycle information 902. The tilt of the selected region is compared with the tilt 903 of the sales achievement. Where the tilt 903 of the sales achievements is not contained in the category of the tilt of the selected region, another region is selected. Where the tilt 903 of the sales achievements is contained in the category of the tilt of the region, the presently selected region is determined as a region 904 to which the sales achievements belong (S905).

After identifying the region 904 to which the sales achievements belong, the product amount-calculating algorithm determination portion 409 identifies an algorithm for calculating the amount of product defined in the region 904 to which the sales achievements of the product life cycle information 902 belong. The algorithm used for calculation of the amount of production 309 is determined (S906).

Concomitantly, a target value 905 of a management index defined in the region 904 to which the sales achievements of the product life cycle information 902 belong is identified (S907) and output to the database 402 of the information on management targets. A parameter intrinsic to the algorithm for calculating the amount of production 309 is computed, as well as the target value 905 of the management index. In the example of FIG. 9, in a case where the method of creating a production plan of the safety stock addition type is adopted as the algorithm for computing the amount of production 309 (where the decision of S908 is YES), a safety stock quantity is calculated using the demand forecasting information 901 in accordance with a general calculational formula (S911).

Then, the production amount calculation portion 409 calculates the amount of calculation using the algorithm determined in the step S906 (S909). Where the amount of production is calculated, it is computed in accordance with the algorithm previously registered in the production amount calculation portion 410. After the calculation of the amount of production, the production amount calculation portion 409 registers the production plan information 906 in the database 405 of the information about production plans.

After the step S909, the GUI 411 outputs the production plan information 906, which has been calculated by the production amount calculation portion 410, to the external output device 104 (step S910).

FIG. 10 shows an example in which the results of calculations are shown in a tabular form. The left part of the table of FIG. 10 indicates amounts of production calculated by the production amount calculation portion 410 for each individual item of products and markets. On the other hand, the right part of the table indicates the amount of stock and the amount of stockout when the amount of production calculated by the production amount calculation portion 410 is actually manufactured, the values of management indexes (stock turnover rate and stockout rate), and the probabilities of occurrences of the scenarios of FIG. 5, in a case where the actual amount of requirement is coincident with the forecasted value in a scenario. The results in the first row indicate that the amount of production or the number of manufactured products, i.e., personal computers, calculated in the step S909 for calculating the amount of production in the Japanese market on Sep. 1, 2004 is 160. In the scenario with a forecasted number of 100 and a probability of occurrence of 40%, a stock of 60 products occurs. In the scenario with a forecasted number of 200 products and a probability of occurrence of 60%, a stockout of 40 products occurs.

In this way, the numbers of products calculated for each different item of products, markets, and dates, stock quantities and stockout quantities obtained in the different scenarios, and stock turnover rates and stockout rates (values of management indexes) obtained in the different scenarios may be displayed as a list. Alternatively, they may be displayed as separate tables. Furthermore, time-sequence transitions of amounts of production (number of manufactured products) obtained for each different item of products and markets, stock quantities and stockout quantities obtained in the different scenarios, and stock turnover rates and stockout rates in the different scenarios may be displayed on a graph. The amount of production is plotted on the vertical axis, while the date is plotted on the horizontal axis.

Processing performed by the production plan creation portion 410a of the demand variation input type will be described next, the creation portion 410a being used in the production planning system 203 for minimizing the risk of demand variations in accordance with the present invention.

FIG. 11 is a diagram showing the functional configuration of the production plan creation portion 410a of the demand variation input type. The plan creation portion 410a has five processing functional portions, i.e., a data reading portion 1101, a scenario information creation portion 1102, a model creation portion 1103, an optimization calculation portion 1104, and a displayed data calculation portion 1105.

Information about a model used to calculate the amount of production 309 is registered in the model creation portion 1103. The model defines an algorithm having a procedure or calculational formulas to calculate the amount of production 309. An example of a conventional model is shown in column (a) of FIG. 12. An example of a model of the present invention is shown in column (b) of FIG. 12.

In the conventional production planning method, only one amount of request is discussed for each one of product, market, and date. It is assumed that it achieves 100% success. Under this assumption, the amount of production is computed. It is assumed that, if the calculated amount of production does not reach the amount of request, a stockout occurs; and, if the amount of production exceeds the amount of request, a stock condition occurs. Under this assumption, the amount of stockout and the amount of stock are determined. The values of management indexes are calculated using the amount of stockout and amount of stock. An amount of production that maximizes the achievement ratios of the management index values to their targets are determined. In the example shown in column (a) of FIG. 12, the number of products A required on September 1 is 160. A calculation shows that the number of manufactured products is 160. Since there is no excess or shortage of the number of manufactured products compared with the amount of request, the number of stockouts and the number of stocks are both zero. In this example, the stockout rate and the stock turnover rate are adopted as management indexes. The stockout rate is calculated by dividing the number of stockouts by the number of required products and then multiplying the result by 100. The stockout turnover rate is calculated by dividing the number of stocks by the number of required products and then multiplying the result by 100. Accordingly, in the present embodiment, the stockout rate and stockout turnover rate are both 0%.

On the other hand, in accordance with the present invention, the probability of occurrence for each item of products, markets, and dates is less than 100%. The sum of all of the probabilities of occurrence is 100%. In this way, plural amounts of requests and their probabilities of occurrence (i.e., plural scenarios) are assumed. Therefore, if the number of stockouts and the number of stocks are calculated for only any one amount of requests, it is impossible to calculate the numbers of stockouts and the numbers of stocks for other amounts of requests. Accordingly, the number of stockouts and the number of stocks are calculated at each probability of occurrence. The calculated values are multiplied by their probabilities of occurrence and summed up for all the probabilities of occurrence. In this way, the number of stockouts and the number of stocks for the production plan are computed. That is, an evaluation can be made at a probability of occurrence of 100%. Using the found number of stockouts and the number of stocks for the production plan, the value of the management index is calculated. The number of manufactured products which maximizes the achievement ratio of the management index values to their targets is determined. In accordance with the present invention, minimizing the risk of demand variations is to maximize the achievement ratios of the management indexes to their targets. In the example shown in column (b) of FIG. 12, the number of required products A at September 1 is 100 at a probability of occurrence of 40% and is 200 at a probability of occurrence of 60%. The number of required products in the production plan is 160. It is assumed that the result of a calculation indicates that the number of manufactured products is 160. If 160 products are manufactured and there is a request for 100 products in actual practice, there is a stock of 60 products. If there is a request for 200 products, there is a stockout of 40 products. The number of products out of stock and the number of products in stock are both 24 in the production plan. Furthermore, the stockout rate and the stock turnover rate are adopted as management indexes. The stockout rate is calculated by dividing the number of products out of stock in the production plan by the number of required products and then multiplying by 100. The stock turnover rate is calculated by dividing the number of products in stock in the production plan by the number of required products and then multiplying by 100. Accordingly, in the present embodiment, the stockout rate and stock turnover rate are both 15%.

In this way, in the conventional model, it has been assumed that the number of required products is achieved with 100% success. Therefore, the stockout rate and stock turnover rate have been both regarded to be 0%. On the other hand, in accordance with the present invention, plural numbers of required products are assumed. In particular, the probability of occurrence at each number of required products is less than 100%. The sum of all the probabilities of occurrence is 100%. More specifically, in one scenario, the number of required products resulting in an out of stock condition is assumed. In another scenario, the number of required products resulting is an excess stock condition is assumed. A tradeoff relation between the number of stockouts and the number of stocks can be evaluated. A stockout rate and a stock turnover rate, which can be produced where any number of required products is achieved, can be evaluated. That is, the values of the management indexes can be evaluated. In other words, the tradeoff relation between the stockout rate and the stock turnover rate can be quantitatively evaluated. A production plan in which the risk of demand variations is minimized can be calculated by maximizing the achievement ratio to their targets using the values.

Information about the aforementioned model is stored in a format adapted for the optimization algorithm used for the optimization calculation. For example, where linear programming is used for the optimization algorithm, formulas for calculating the number of manufactured products and management indexes are described in terms of linear equations. Where non-linear programming is used, formulas for calculating the number of manufactured products and management indexes are described in terms of non-linear equations.

Figure 13:
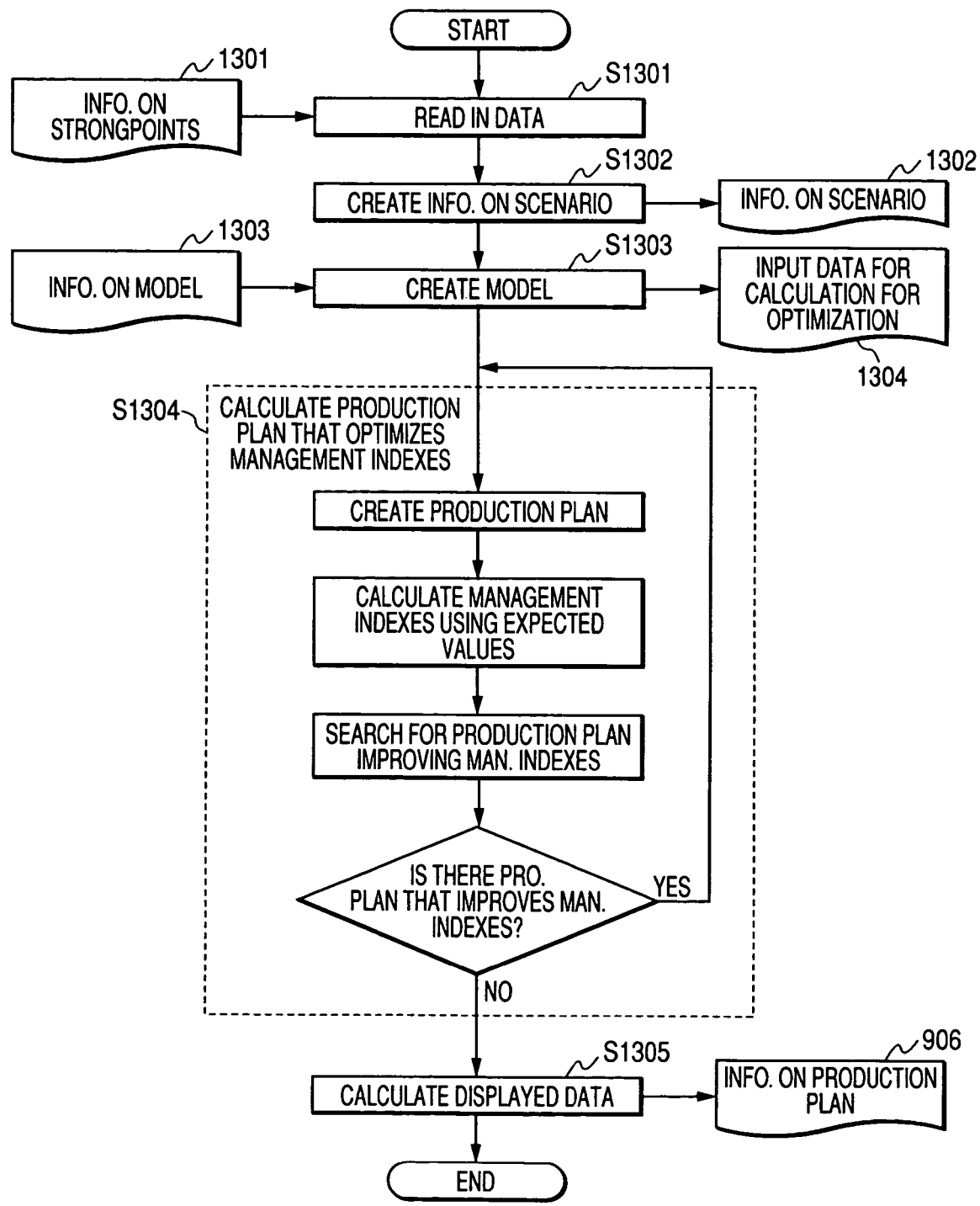
FIG. 13 is a flowchart illustrating the flow of processing in the production plan creation portion of the demand variation input type shown in FIG. 4.

The flow of processing performed by the production plan creation portion 410a of the demand variation input type in accordance with the present invention will be described next with reference to FIG. 13.

When the production plan creation portion 410a of the demand variation input type is started, the data reading portion 1101 reads in data stored in a database 403 of the information 1301 on strongpoints (step S1301). In the production plan creation portion 410a of the demand variation input type, data 901, which has been read into the production plan creation system minimizing the risk of demand variations, is used as data for forecasting the demand. The value 905 (target value of a management index) determined by the production plan creation system 203 minimizing the risk of demand variations is used as data about a management target.

After reading in the data, the scenario information creation portion 1102 creates scenario information 1302 from data 901 about demand forecasting (especially, forecasted value 303 of amount of request calculated by the demand forecasting system 202) from information about orders received (achievement of orders at the time when the plan was created), and from the past achievements of the forecasting of the demand (step S1302). With respect to the scenario information 1302, the forecasting accuracy of the demand forecasting system 202 is taken as the probability of occurrence of the forecasted value 303 of the amount of request calculated by the demand forecasting system 202. The other probabilities of occurrence are appropriately assigned to amounts of requests each of which is obtained by adding or subtracting an amount of error to or from the forecasted value 303 of the amount of request calculated by the demand forecasting system 202. Also, scenarios to be grouped are identified from past achievements of demand forecasts, and group information is added.

Then, in the model creation portion 1103, input data is mapped onto previously registered model information 1303 used for optimization calculation to create input data 1304 for the optimization calculation (step S1303). As an example, where linear programming is applied to the present invention, the input data 1304 for optimization calculation is created by substituting scenario information 1302, strongpoint information 1301, and management target data (target values of management indexes) 905 into given coefficients of registered linear equations. The same theory is applied in a case where an optimization algorithm other than linear programming is applied.

After creating the input data 1304 for optimization calculation, the optimization calculation portion 1104 reads in the input data 1304 for the optimization calculation and calculates an amount of production that maximizes the achievement ratio to their targets using values of management indexes by the optimization algorithm (step S1304).

An example of the optimization algorithm is given below. First, one production plan is created as an initial solution. The difference between the amount of production (or the number of manufactured products) in the created plan and the amount of request (or the number of required products) is taken. Where the amount of production exceeds the amount of request, it is calculated as an amount of stock. Where the amount of production is less than the amount of request, it is calculated as an amount of stockout. The amount of stock and the amount of stockout are multiplied by their probabilities of occurrence. The products are summed up for each different item of products, markets, and dates of request. In this way, expected values of the amount of stock and amount of stockout are calculated. Using these values, the values of the management indexes are computed. Then, simulational calculations are performed to seek an improved production plan in which the values of the management indexes are further improved, by slightly varying the present production plan (i.e., computationally found amount of production). If such a production plan in which the values of the improved management indexes are improved is discovered, the processing is repeated from the step of calculating the amount of stock and the amount of stockout for this production plan. If any production plan in which the values of the management indexes are improved is not discovered finally, or if a given calculation time has elapsed, the loop for calculating the production plan is ended.

After the end of the step S1304 for optimization calculation, the amount of production calculated by the optimization calculation is substituted into the model information 1303 registered in the model creation portion 1103 to calculate the values of the management indexes (step S1305). Furthermore, in each scenario, the amount of request is compared with the amount of production computed by the optimization calculation. A shortage of the amount of production is taken as an amount of stockout. An excess of the amount of production is taken as an amount of stock (step S1305). Besides, numerical values used for display are calculated and registered in the database 405 of the information on production plans (step S1305).

In the processing performed by the production planning system 203 for minimizing the risk of demand variations, one kind of scenario information 1302 may be created and a production plan may be computed after reading in the input data, as described above.

In accordance with the present invention, an amount of production (or number of manufactured products) is determined, previously taking into account demand variations, within the ranges of the amounts of supplied materials and the range of the production capacity so as to minimize adverse effects on management indexes, such as overstock and out-of-stock conditions, even if the demand varies. Thus, if demand variations take place, management indexes can be prevented from deteriorating, such that the amount of materials in the introduced production plan does not become insufficient or excessive without adjusting the production capacity.

Furthermore, according to the present invention, in the introduced plan, it is not necessary to make adjustments to cope with a shortage or excess of materials. Also, it is not necessary to adjust the production capacity. Hence, the process steps in the operations of the introduced plan can be reduced greatly.

Additionally, in accordance with the present invention, the range of the tilt of the forecasted value of sale from which an amount of production will be calculated is identified. That is, it is known where the range is located in the product life cycle (e.g., in initial phase, matured phase, or attenuating phase). A method of creating a production plan appropriately according to each phase of the product life cycle is determined. That is, an algorithm used for calculation of the amount of production is determined. Where the method of creating a production plan of the demand variation input type is applied, target values of management indexes used for the calculation are determined from the range of tilt of the forecasted value of the sale of products. Therefore, excessive process steps are not consumed in determining the method of creating a production plan or calculating the target values of the management indexes. Deterioration of the management indexes due to an excess or shortage of the materials can be prevented.

What is claimed is:

1. A method of creating a production plan to minimize risk of demand variations, the method carried out by a computer and comprising:

receiving strongpoint information including characteristics of manufacturing plants and parts vendors and supply routes for materials and manufactured products, and storing the strongpoint information in a first database;

receiving and storing, in a second database: information about demand forecasting and orders received for each different item of products, markets, and dates, and past demand forecast accuracy information which is defined by comparing the past forecasted amounts of demand with actual amounts of requirement;

receiving and storing, in a third database: information about a product life cycle that is a forecasted value of a transition of a volume of sale after a date of start of sale of products, information about division of the product life cycle specifying ranges obtained by dividing the product life cycle into plural ranges along a time axis, and information about ranges of the product life cycle include a range of tilt of the product life cycle, an algorithm used to calculate an amount of production, and target values of management indices for each item of products, markets, and ranges of the product life cycle;

receiving a past actual volume of sale and forecasted values of amounts of request of a product planned to be manufactured for each different item of markets and dates, and past demand forecast accuracy information from the second database, and information about ranges of the product life cycle of products similar to the product planned to be manufactured from the third database;

calculating a tilt of a sales achievement for a specified period from the past to the future, based on the past actual volume of sale and the forecasted values of volume of request of the product planned to be manufactured, for each different item of markets and dates, and determining the range of the product life cycle having a range of tilt of the product life cycle containing the calculated tilt of the sales achievement for a specified period from the past to the future, that corresponds to the region to which the sale achievements belong;

executing, by the computer, a program of a first method of creating a production plan, wherein the range of the product life cycle of the product planned to be manufactured is based on an unstable region of the product life cycle, or the program of a second method of creating a production plan that creates the volume of production by adding a safety stock quantity to a uniquely defined volume of request, wherein the range of the product life cycle of the product planned to be manufactured is based on an unstable region of the product life cycle;

wherein the program of the first method of creating a production plan is executed;

creating, by the computer, a plurality of scenario information in which the past demand forecast accuracy information is utilized regarding a probability of occurrence of the forecasted values of volume of request of the product planned to be manufactured for each different item of markets and dates, further probabilities of occurrence are assigned to volume of requests each of which is obtained by adding or subtracting a volume of error to or from the forecasted values of volume of request of the product planned to be manufactured, and the sum of all the probabilities of occurrence is 100%, so that at least in one scenario, the number of required products resulting in an out of stock is assumed, in another scenario, the number of required products resulting in a stock is assumed;

creating one production plan to minimize risk of demand variations as an initial solution, calculating the difference between the amount of production in the created plan and the amount of request, calculating expected values of the amount of stock and amount of stockout for each scenario, and determining values of management indexes, based on the plurality of scenario information, the strongpoint information received from the first database, and the target values of the management indexes, the strongpoint information including characteristics of manufacturing plants and parts vendors and supply routes for materials and manufactured products, where the management indexes correspond to the first method of creating a production plan; and determining for an improved production plan minimizing risk of demand variations in which the values of the management indexes are further improved, by varying the present production plan, and simultational calculations, and calculating the production plan that maximizes achievement ratios of the values of the management indexes to their targets within ranges of amounts of supplied materials and range of production capacity received from the first database.

2. A method of creating a production plan as set forth in claim 1, wherein the volume of stockout and the volume of stock are calculated in each different scenario for each different item of the products, markets, and dates, wherein the volume of stockout and the volume of stock in each different scenario are multiplied by said probabilities of occurrence and the resulting products are summed up for all the scenarios to calculate a volume of stockout and an volume of stock for the production plan, and wherein said values of the management indexes are calculated, using the calculated volume of stockout and volume of stock for the production plan.

3. A method of creating a production plan as set forth in claim 1, wherein the ranges obtained by dividing the product life cycle into the plural ranges along a time axis, are partitioned at locations where the tilt varies.

* * * * *